United States Patent
Wassen et al.

[11] 3,919,870
[45] Nov. 18, 1975

[54] METHOD OF CLEANING TOOL PARTS IN EXTRUDERS

[75] Inventors: Johann Wassen, Brackwede; Josef Hesse, Hilden, both of Germany

[73] Assignee: Mannesmannrohren-Werke AG, Dusseldorf, Germany

[22] Filed: Aug. 14, 1974

[21] Appl. No.: 497,190

[30] Foreign Application Priority Data
Aug. 17, 1973 Germany............................ 2342170

[52] U.S. Cl...................................... 72/39; 72/253
[51] Int. Cl.²................... B21C 35/06; B21C 23/00
[58] Field of Search............... 72/39, 40, 41, 42, 46, 72/253, 264, 265

[56] References Cited
UNITED STATES PATENTS
2,893,555   7/1959   Buffet et al............................ 72/42
3,097,742   7/1963   Lamberty............................... 72/42

FOREIGN PATENTS OR APPLICATIONS
768,991   2/1957   United Kingdom..................... 72/42

Primary Examiner—C. W. Lanham
Assistant Examiner—E. M. Combs
Attorney, Agent, or Firm—Ralf H. Siegemund

[57] ABSTRACT

The work or blank holder, die, mandrel and press punch or ram in an extrusion press are cleaned, particularly for removal of residue resulting from lubrication of the blank with glass prior to extrusion, in that a mica ring is placed between punch or ram and blank and extruded for most of its parts in the last phases of extruding that blank to obtain the cleaning. A left over portion of that ring is extruded ahead of extruding the next blank.

1 Claim, 2 Drawing Figures

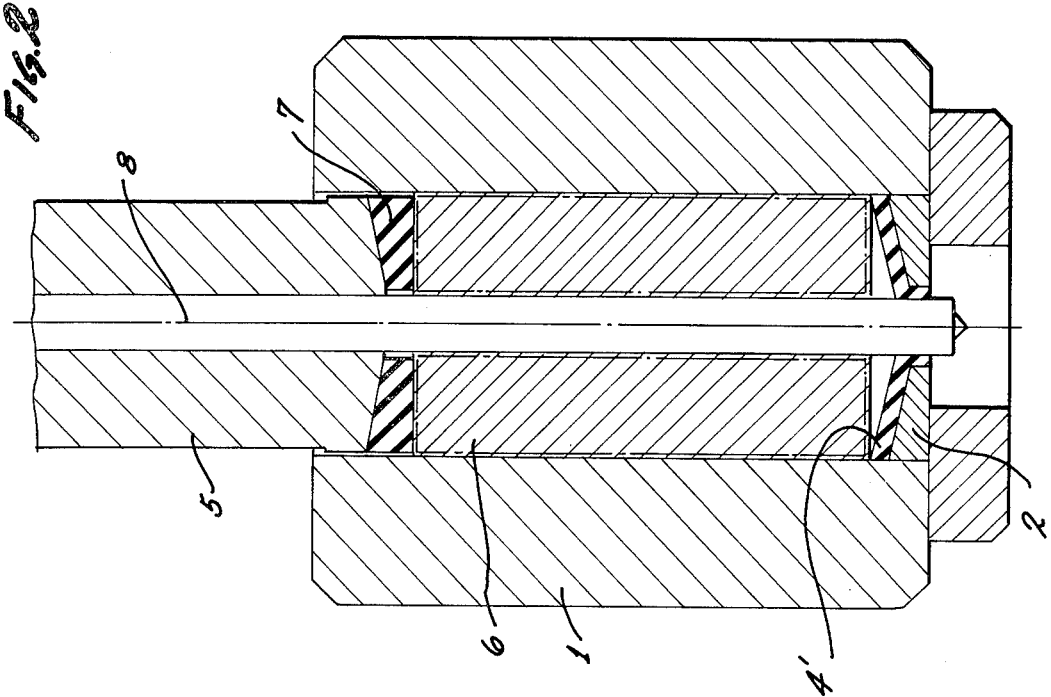
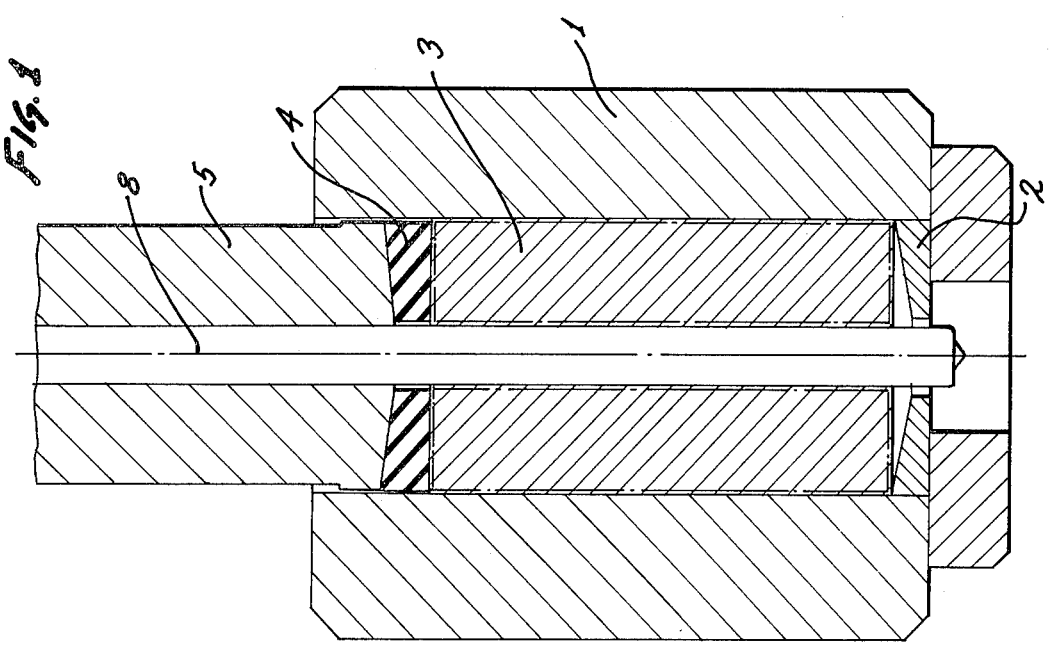

METHOD OF CLEANING TOOL PARTS IN EXTRUDERS

BACKGROUND OF THE INVENTION

The present invention relates to a method for cleaning the parts of an extrusion press, such as die, plunger, punch receiver or work holder, etc.

Glass is used quite frequently as a lubricant in extrusion press machines; however, it is also known that the several press parts including the work will be covered with a glass layer which is very difficult to remove. Glass, however, is a very good lubricant in the extrusion process, so that there is a long felt need for finding a method which cleans the press parts permitting utilization of glass as lubricant without unwanted side effects.

The known methods purporting to obviate the problem operate with a loose press disk as lubricant, as the freezing of the glass into the inside wall of the blank holder precludes retraction of the punch. Thus, one has to remove the die after each extrusion step, and the press disk must be pushed forward. This method cannot be used in mechanical extrusion presses, as the punch head often tears on retraction.

DESCRIPTION OF THE INVENTION

It is an object of the present invention to remove the glass residue from machine parts of an extrusion press which uses glass as lubricant.

In accordance with the preferred embodiment of the present invention, it is suggested to place an annular disk between blank and press punch or ram, which disk engages the blank holder and the mandrel of the extrusion press. During the final phases of extrusion, the disk is pressed and extruded also until only very little of the disk material remains in the die. The disk as extruded takes up all that remains of the lubricant (glass powder) in the die and on the blank holder and cleans mandrel and punch or ram. The remainder of the disk will be extruded with the next blank and enhances cleaning of the die accordingly.

The "cleaning" disk is preferably made of compressed mica of which water of crysta-lization has been removed by 90 percent. Prior to compression metal salt, such as sodium nitride, sodium-, potassium- or barium chloride or the like may be added to the mica, not exceeding 15 percent. The disk is of annular configuration, so that it scrapes not only along the wall of the work holder and of the die but it carries along also any glass residue as adhering to mandrel and punch. However, the mica disk itself does not provide for the needed lubrication.

It was found that upon practicing the method of the invention, utilization of glass containing lubricant in extrusion press working of metal is now made possible without posing problems as to cleaning of the various tool parts. The invention is not just applicable for the removal of glass containing lubricant, as commonly used in extrusion, but other lubricants which are harmful to the various tool parts can also be removed as the extruded mica forms a protection over the various machine part surfaces to which lubricant may adhere.

DESCRIPTION OF THE DRAWING

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 shows somewhat schematically a cross-section through a press for extrusion of metal blanks with initial placement of a protective and cleaning annulus between ram and blank and FIG. 2 shows a similar phase but with the next blank and the remainder of the previously used cleaning disk.

Proceeding to the detailed description of the drawings, the figures show a die 2 for extruding a tube from a tubular blank, such as a metal, preferably a steel blank 3 in FIG. 1. A work holder 1 receives the blank until extruded by means of a ram or press punch 5. The blank is hollow and traversed by a mandrel 8, projecting into the die opening to obtain a hollow (tubular) work-piece.

A mica ring, disk or annulus 4 with most of its water of crystallization (at least 90%) removed and 10 to 15% metal salt, such as alkaline halide, added, is placed between press punch 5 and blank 3. The blank 3 is covered or coated with a glass powder for lubrication.

Upon extrusion blank material flows through the die 2, but glass is caused to adhere to the mandrel 8 and to the work holder 1. Now, in the final phases of extrusion, mica disk 4 will be extruded to a considerable extent thereby cleaning mandrel and work holder. Also, due to the fact that ram 5 does not directly engage blank 3, lubricant is kept from the ram or punch 5. The extruded mica can be removed easily from the completed work to the extent it adhered thereto. That mica portion can be just broken off the work.

A little of the mica disk (4' in FIG. 2) will remain in front of the die, and will, in fact, remain therein to be extruded ahead of extrusion of the next blank 6, in the rear of which has been placed another one of the cleaning disk 7 for cleaning the press after extrusion of blank 6.

The invention is not limited to the embodiments described above, but all changes and modifications thereof not constituting departures from the spirit and scope of the invention are intended to be included.

We claim:

1. Method of cleaning a work holder, die, mandrel, and a press punch or ram of an extrusion press used for extruding a blank covered with a lubricant, comprising:
   placing a compressed mica disk, from which at least 90 percent of the water of crystallization has been removed, directly between the blank and the press punch or ram prior to extrusion, the disk being of annular configuration and engaging the work holder and the mandrel; and
   extruding the disks in the final phases of extrusion of the blank, so that only a small portion of the disk remains in front of the die, and remains therein to be extruded ahead of extrusion of the next blank, for which extrusion another mica disk is placed between the ram and the said next blank in the same manner as in the previous extrusion.

* * * * *